United States Patent
Luong et al.

(10) Patent No.: US 10,216,524 B2
(45) Date of Patent: Feb. 26, 2019

(54) SYSTEM AND METHOD FOR PROVIDING FINE-GRAINED MEMORY CACHEABILITY DURING A PRE-OS OPERATING ENVIRONMENT

(71) Applicant: DELL PRODUCTS, LP, Round Rock, TX (US)

(72) Inventors: Anh D. Luong, Austin, TX (US); Juan F. Diaz, Round Rock, TX (US); William A. Moyes, Austin, TX (US)

(73) Assignee: Dell Products, LP, Round Rock, TX (US)

(*) Notice: Subject to any disclaimer, the term of this patent is extended or adjusted under 35 U.S.C. 154(b) by 51 days.

(21) Appl. No.: 15/630,511

(22) Filed: Jun. 22, 2017

(65) Prior Publication Data
US 2018/0373543 A1    Dec. 27, 2018

(51) Int. Cl.
*G06F 9/30* (2018.01)
*G06F 9/4401* (2018.01)
*G06F 12/1009* (2016.01)

(52) U.S. Cl.
CPC .......... *G06F 9/4403* (2013.01); *G06F 9/3004* (2013.01); *G06F 12/1009* (2013.01)

(58) Field of Classification Search
CPC ................ G06F 9/4403; G06F 9/4405; G06F 12/1009–12/1018
USPC ...................................................... 713/1–2
See application file for complete search history.

(56) References Cited

U.S. PATENT DOCUMENTS

| | | | |
|---|---|---|---|
| 7,752,427 B2 | 7/2010 | Lambrache et al. | |
| 9,507,581 B2 | 11/2016 | Butcher et al. | |
| 2003/0023812 A1 | 1/2003 | Nalawadi et al. | |
| 2003/0061531 A1* | 3/2003 | Fletcher | G06F 9/4401 714/6.32 |
| 2004/0133790 A1 | 7/2004 | Hensley | |
| 2004/0153733 A1 | 8/2004 | Lin | |
| 2006/0123223 A1 | 6/2006 | Mayfield et al. | |
| 2008/0209578 A1* | 8/2008 | Ghetie | G06F 21/79 726/30 |
| 2014/0365755 A1 | 12/2014 | Liu et al. | |
| 2015/0089238 A1 | 3/2015 | Lewis | |
| 2017/0052791 A1* | 2/2017 | Jenne | G06F 9/4403 |

\* cited by examiner

*Primary Examiner* — Nathan Sadler
(74) *Attorney, Agent, or Firm* — Larson Newman, LLP

(57) ABSTRACT

An information handling system includes a memory with a cache, and a processor to execute pre-operating system (pre-OS) code before the processor executes boot loader code. The pre-OS code sets up a Memory Type Range Register (MTRR) to define a first memory type for a memory region of the memory, sets up a page attribute table (PAT) with an entry to define a second memory type for the memory region, disables the PAT, and pass execution by the processor to the boot loader code. The first memory type specifies a first cacheability setting on the processor for data from the memory region, and the second memory type specifies a second cacheability setting on the processor for data from the memory region.

20 Claims, 3 Drawing Sheets

SYSTEM AND METHOD FOR PROVIDING FINE-GRAINED MEMORY CACHEABILITY DURING A PRE-OS OPERATING ENVIRONMENT

FIELD OF THE DISCLOSURE

This disclosure generally relates to information handling systems, and more particularly relates to providing fine-grained memory cacheability during a pre-OS operating environment.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system can include a memory with a cache, and a processor to execute pre-operating system (pre-OS) code before the processor executes boot loader code. The pre-OS code may set up a Memory Type Range Register (MTRR) to define a first memory type for a memory region of the memory, set up a Page Attribute Table (PAT) with an entry to define a second memory type for the memory region, disable the PAT, and pass execution by the processor to the boot loader code. The first memory type may specify a first cacheability setting on the processor for data from the memory region, and the second memory type may specify a second cacheability setting on the processor for data from the memory region

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
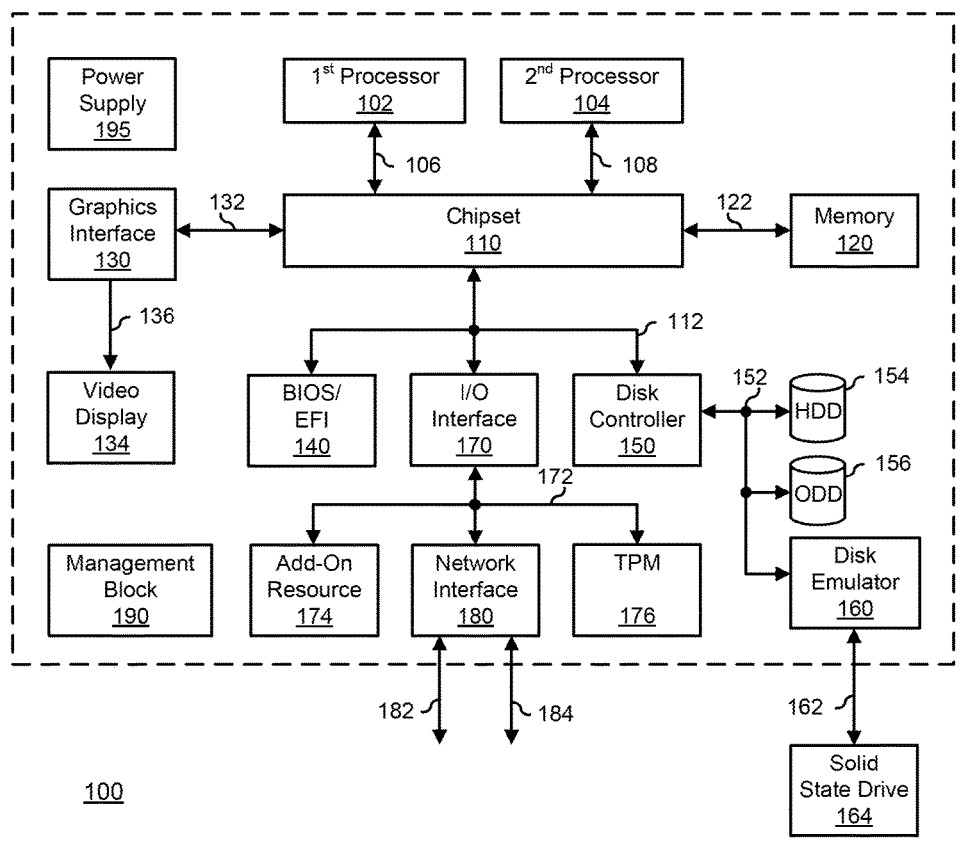
FIG. 1 is a block diagram illustrating a generalized information handling system according to an embodiment of the present disclosure.

FIG. 1 illustrates a generalized embodiment of an information handling system 100. For purpose of this disclosure information handling system 100 can be configured to provide the features and to perform the functions of the OPF system as described herein. Information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of information handling system 100 can include one or more storage devices that can store machine-executable code, one or more communications ports for communicating with external devices, and various input and output (I/O) devices, such as a keyboard, a mouse, and a video display. Information handling system 100 can also include one or more buses operable to transmit information between the various hardware components.

Information handling system 100 can include devices or modules that embody one or more of the devices or modules described below, and operates to perform one or more of the methods described below. Information handling system 100 includes a processors 102 and 104, a chipset 110, a memory 120, a graphics interface 130, a basic input and output system/extensible firmware interface (BIOS/EFI) module 140, a disk controller 150, a hard disk drive (HDD) 154, an optical disk drive (ODD) 156, a disk emulator 160 connected to an external solid state drive (SSD) 162, an input/output (I/O) interface 170, one or more add-on resources 174, a trusted platform module (TPM) 176, a network interface 180, a management block 190, and a power supply 195. Processors 102 and 104, chipset 110, memory 120, graphics interface 130, BIOS/EFI module 140, disk controller 150, HDD 154, ODD 156, disk emulator 160, SSD 162, I/O interface 170, add-on resources 174, TPM 176, and network interface 180 operate together to provide a host environment of information handling system 100 that operates to provide the data processing functionality of the information handling system. The host environment operates to execute machine-executable code, including platform BIOS/EFI code, device firmware, operating system code, applications, programs, and the like, to perform the data processing tasks associated with information handling system 100.

In the host environment, processor 102 is connected to chipset 110 via processor interface 106, and processor 104 is connected to the chipset via processor interface 108. Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to each of processors 102 and 104 via separate memory interfaces. An example of memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources.

Disk controller 150 includes a disk interface 152 that connects the disk controller to HDD 154, to ODD 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Management block 190 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 100. In particular, management block 190 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 100, such as system cooling fans and power supplies. Management block 190 can include a network connection to an external management system, and the management block can communicate with the management system to report status information for information handling system 100, to receive BIOS/UEFI or system firmware updates, or to perform other task for managing and controlling the operation of information handling system 100. Management block 190 can operate off of a separate power plane from the components of the host environment so that the management block receives power to manage information handling system 100 when the information handling system is otherwise shut down. An example of management block 190 may include a commercially available BMC product that operates in accordance with an Intelligent Platform Management Initiative (IPMI) specification, such as a Integrated Dell Remote Access Controller (iDRAC), or the like. Management block 190 may further include associated memory devices, logic devices, security devices, or the like, as needed or desired.

Power supply 195 represents one or more devices for power distribution to the components of information handling system 100. In particular, power supply 195 can include a main power supply that receives power from an input power source, such as a wall power outlet, a power strip, a battery, or another power source, as needed or desired. Here, power source 195 operates to convert the power at a first voltage level from the input power source to one or more power rails that are utilized by the components of information handling system. Power supply 195 can also include one or more voltage regulators (VRs) that each receive power from the main power supply and that operate to convert the input voltage to an output voltage that is used by one or more components of information handling system. For example, a VR can be provided for each of processors 102 and 104, and another VR can be provided for memory 120. Power supply 195 can be configured to provide a first power plane that provides power to the host environment, and to provide a second power plane that provides power to the management environment.

Figure 2:
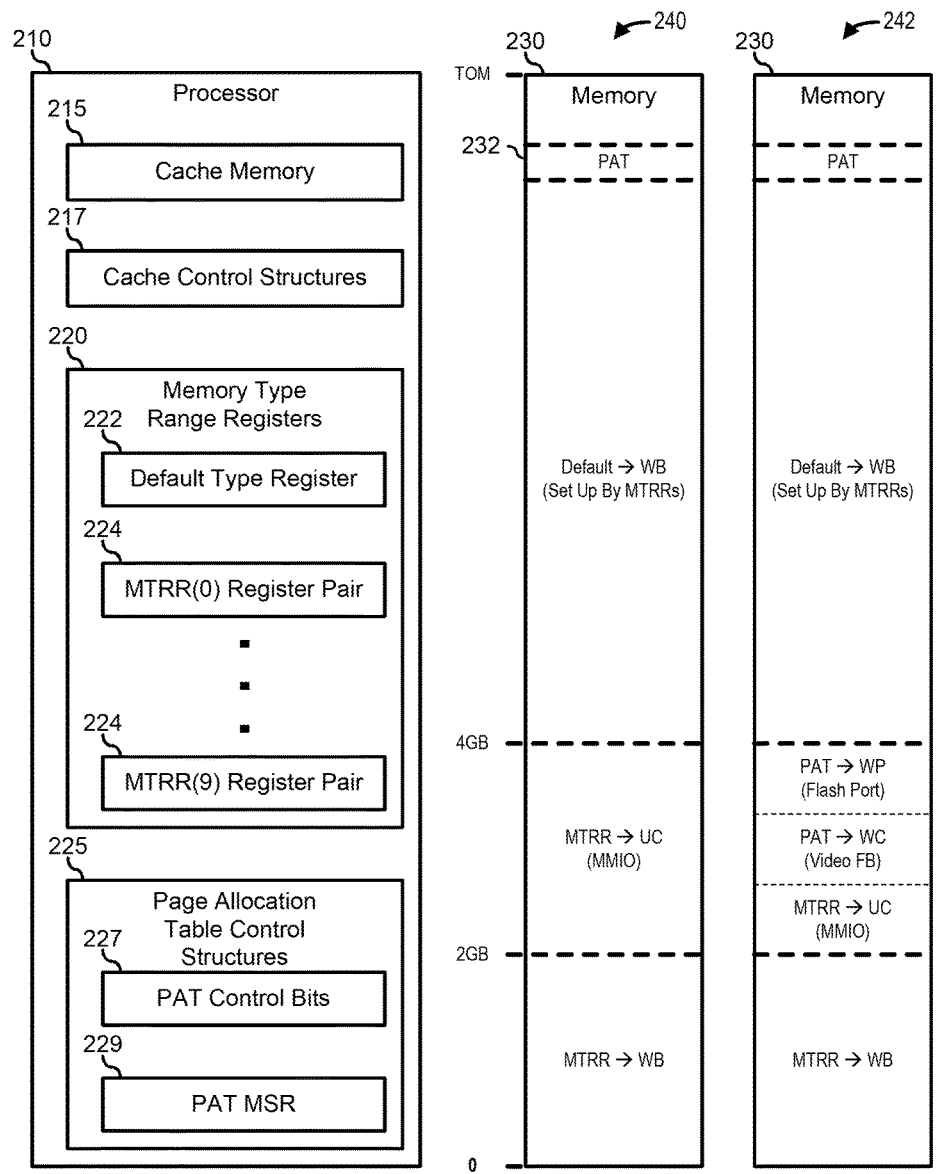
FIG. 2 is a block diagram illustrating an information handling system similar to the information handling system of FIG. 1, according to an embodiment of the present disclosure.

FIG. 2 illustrates an information handling system 200 similar to information handling system 100, including a processor 210 similar to processors 102 and 104, and a memory 230 similar to memory 120. Processor 210 includes cache memory 215 that operates to store code and data that has recently been fetched from memory 230 and utilized by the processor. By maintaining a copy of recently used code and data in cache memory 215, the performance of processor 210 is greatly improved. The operation of the cache memory 215 and the interactions between the cache memory and memory 230 are controlled by cache control structures 217, Memory Type Range Registers (MTRRs) 220, and Page Attribute Table (PAT) control structure 225. Cache control structures 217 operate to provide various control registers and bit locations for enabling and controlling the cache operations of cache memory 215. As such, particular registers or bit locations of cache control structures 217 operate to enable or disable the operation of the cache memory 215 for caching for various types of memory, and to define the types of memory caching that is available on the processor. For example, by programming cache control structures 217, processor 210 can have caching operations enabled or disabled on cache memory 215, and if enabled, can select between operating in accordance with a Modified, Exclusive, Shared, Invalid (MESI) caching protocol or in accordance with one or more modified MESI protocols, can select between various paging modes for accessing memory 230, and can enable or disable the operation of MTRRs 220 and PAT control structure 225, as described further, below. Processor 210 operates to permit the regions of memory 230 to be cached into cache memory 215 by specifying various blocks of the memory as being associated with a particular memory type. In a particular embodiment, processor 210 implements unchacheable (UC) memory, write combining (WC) memory, write through (WT) memory, write back (WB) memory, and write protected (WP) memory types.

MTRRs 220 provide a mechanism to associate the memory types with physical address ranges of memory 230. In particular, MTRRs 220 permit the optimization of operations for various memory elements mapped to the various physical address ranges, such as Random Access Memory (RAM), Read Only Memory (ROM) such as BIOS ROM or firmware, video frame buffer memory, and memory mapped input/output (MMIO) devices. MTRRs 220 include default memory type register 222, and a number of variable MTRR register pairs 224. In a particular embodiment, processor 210 provides for a number of fixed range MTRRs in addition to variable MTRR pairs 224 that define specific memory types at the bottom of memory 230 that are utilized for various system level activities. Default memory type register 220 operates to set a default memory type for regions of memory 230 that are not otherwise defined by one or more of the fixed MTRRs and variable MTRRs 220. Default memory type register 220 may also provide a bit location to enable or disable one or more of the fixed MTRRs and variable MTRRs 224. In a particular embodiment, default memory type register 220 sets the default memory type for memory regions below 4 GB as unchacheable (UC). Variable MTRR register pairs 224 represent a pair of 64-bit registers of processor 210 that define the parameters of the various memory ranges. In a particular embodiment, a first register of a variable MTRR register pair 224 specifies the base physical address of memory 230 that is the subject of the variable MTRR register pair, and a memory type associated with the memory region that starts at the specified physical address. Further, the second register of the variable MTRR register pair 224 specifies a physical mask that determines the range physical addresses of memory 230 that are the subject of the variable MTRR register pair, and includes a bit location that defines whether or not the variable MTRR register pair is valid. In a particular embodiment, processor 210 includes ten (10) variable MTRR register pairs. In another embodiment, one or more of variable MTRR register pairs 224 set the memory type for memory regions above 4 GB as write back (WB).

PAT control structure 225 operate to provide various control registers and bit locations for enabling and controlling of the PAT extension to the memory region control provided by MTRRs 220. The PAT extension allows memory types to be assigned to finer-grained regions of memory 230. Here, MTRRs 220 provide a limited number of memory regions, and are not provided in any particular order, that is, successive variable MTRR register pairs 224 need not specify contiguous memory regions, nor do the memory regions need to be in any particular order. The PAT mechanism provides a mapping of successive memory regions in a PAT 232 in memory 230, and ascribes a particular memory type to each of the memory regions. PAT control structure 225 includes PAT control bits 227 and a PAT Machine Specific Register (MSR) 229. PAT control bits 227 control the enabling of the PAT mechanism in processor 220, and provide a base physical address for PAT 232 in memory 230. PAT MSR 229 includes eight (8) page attribute fields that each specify a memory type. In a particular embodiment, entries in PAT 232 specify memory types of linear regions of memory 230 of 4 kilobytes (KB), of 2 megabytes (MB), or of 1 gigabytes (GB) size.

In a particular embodiment, processor 210 operates in accordance with the Intel 64 and IA-32 Architectures Developer's Manual, version 062. The characteristics of the various memory types, the priority of various memory type designations when a particular region is designated with multiple designations, the details as to the contents of cache control structures 217, MTRRs 220, and PAT control structure 225, and other details as to the operations thereof are beyond the scope of the present disclosure and will not be further discussed herein, except as needed to understand the teachings of the present disclosure.

Typically during a pre-operating system (pre-OS) stage of operation, information handling system 200 utilizes some combination of the fixed MTRRs and variable MTRR register pairs 224 to define the memory types for various memory regions, as needed by the code executing the pre-OS stage. The code that executes the pre-OS stage can include a Basic Input/Output System (BIOS), a Unified Extensible Firmware Interface (UEFI), or another pre-OS operating environment, as needed or desired. For the sake of simplicity, the code that executes the pre-OS stage will henceforth be identified as the system BIOS/UEFI. When the pre-OS stage is completed, the system BIOS/UEFI will pass execution to a boot loader to load up the OS for the run time environment. During the run time environment, the OS typically enables the PAT mechanism of processor 210 by writing a base physical address for PAT 232 and by writing various bits of PAT control bits 227. The OS then maintains PAT 232 for in accordance with the needs of the various programs, functions, and features of the OS. An exemplary memory map 240 of memory 230 is shown where a particular variable MTRR register pair 224 defines a 2 GB memory region from the bottom of the memory as write back (WB) memory, and defines another 2 GB memory region with a base at 2 GB as uncacheable (UC) for MMIO devices, the data from which is not typically cached. PAT 232 is also shown in a high region of memory. The base physical address for PAT 232 can be programmed by the system BIOS/UEFI during the pre-OS stage, or can be programmed by the OS as needed.

In a particular embodiment, during the pre-OS stage, the system BIOS/UEFI operates to enable the PAT mechanism, and to set up PAT entries that provide memory type associations for particular memory regions in memory 230 that are different from the memory type associations as established by MTRRs 220. In this way, various functions that are performed during the pre-OS stage can be associated with memory types that permit faster execution of the various functions. In particular, some I/O functions are not optimized when the region of memory 230 allocated to MMIO activities are designated as uncacheable (UC). For example, a port that is associated with the ROM device that stores the system BIOS/UEFI and other option ROMs may provide code to be executed by processor 210. Here, leaving the port as being associated with the uncacheable (UC) memory type by one or more of MTRRs 220, may result in added latency because code that is repeatedly used would need to be fetched repeatedly from the ROM device. In this case, the system BIOS/UEFI can provide an entry in PAT 232 that sets the physical address range associated with the ROM device as write protected (WP), so that the code can be fetched from the ROM device and stored in cache memory 215. In another example, a region of memory that provides a frame buffer for a video device and that is set as uncacheable by one or more of variable MTRR register pairs 224 would have to be filled in multiple separate memory transactions by processor 210. However, if the system BIOS/UEFI can provide an entry in PAT 232 that sets the physical address range of the frame buffer as write combining (WC), then processor 210 can cache the data to be sent to the frame buffer, and only provide memory transactions when a cache line is completely processed by the processor. Other I/O devices may be determined to operate more efficiently when the memory type associated with the I/O device is associated with a different memory type than is assigned by one or more of MTRRs 220.

During the pre-OS stage, but after the system BIOS/UEFI has enabled the PAT mechanism and reassigned various regions of memory 230 using the PAT mechanism, as described above, the system BIOS/UEFI may need to execute code that is associated with one or more legacy mode (16-bit real mode) operations. Here, the system BIOS/UEFI operates to disable the PAT mechanism, permitting the underlying MTRRs 220 to regain control of the memory typing for memory 230, and thereby maintaining compatibility with the legacy mode operations. It will be understood that the enabling and disabling of the PAT mechanism may be performed by the system BIOS/UEFI multiple times during the pre-OS stage, as needed or desired. Finally, when all of the pre-OS activities are completed, the system BIOS/UEFI disables the PAT mechanism and sets PAT control structure 225 to its default values, in order to reestablish MTRRs 220 as the controlling mechanism for defining memory types for memory 230, in order to ensure compatibility with the boot loader and the OS that runs during the run time phase.

Note that this embodiment may be provided when the physical address space of memory 230 is large. For example, a system BIOS/UEFI may enable the PAT mechanism when the physical address space of memory 230 exceeds 512 GB. Note further that the enabling of the PAT mechanism during the pre-OS stage may greatly improve the speed of the pre-OS stage by providing the fine-grained memory typing that is more properly suited to the various functions and features of the pre-OS stage. In a particular case, the utilization of the PAT mechanism during the pre-OS stage may improve the boot time for information handling system 200. More particularly, in the portions of a particular system BIOS/UEFI that perform graphical user interface (GUI) interactions with the frame buffer, the enabling of the PAT mechanism, and the setting the video frame buffer as the write combining (WC) type, the execution of the GUI interactions were found to be ten (10) times faster than when the video frame buffer was associated with the uncacheable (UC) type under the control of MTRRs 220.

Figure 3:
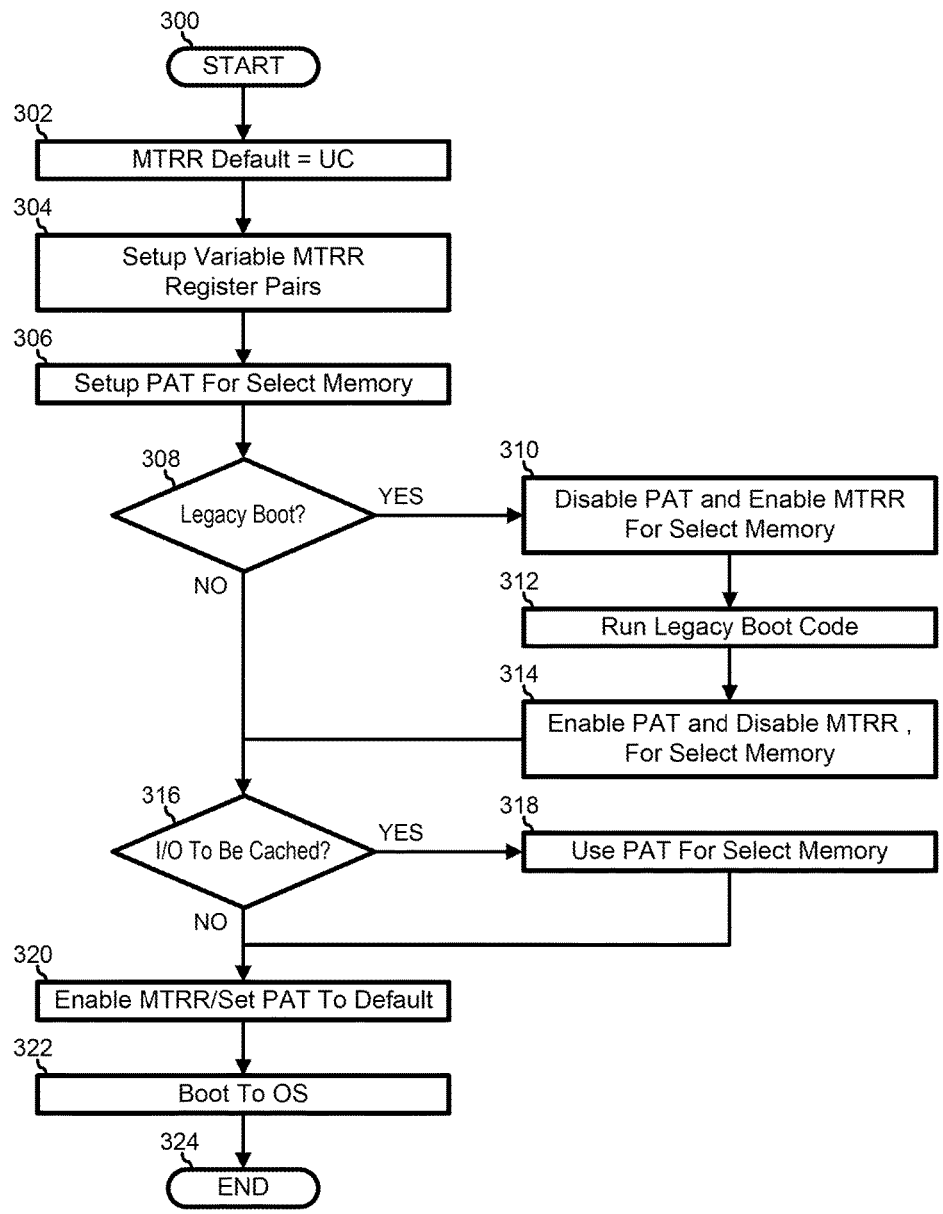
FIG. 3 depicts a flowchart illustrating a method for providing fine-grained memory cacheability during a pre-OS operating environment according to an embodiment of the present disclosure.

FIG. 3 illustrates a method for providing fine-grained memory cacheability during a pre-OS operating environment, starting at block 300. At block 302, a MTRR default type register is setup to provide a default memory type as uncacheable (UC) for the memory of an information handling system. For example, a system BIOS/UEFI can program default type register 222 to identify memory 230 as uncacheable (UC) as the default memory type for memory regions that are otherwise undefined by variable MTRR register pairs 224 or PAT 232. One or more variable MTRR register pairs 224 are setup to define various memory regions as being associated with various memory types in block 304. For example, a first variable MTRR register pair 224 can associate the bottom 2 GB of memory 230 as write back (WB) memory, and a second variable MTRR register pair 224 can associate the next 2 GB of the memory as uncacheable (UC), as shown in exemplary memory map 240.

In block 306, while still executing code in the pre-OS stage, the PAT mechanism on the processor of the information handling system is enabled and one or more regions of the memory are specified as having various memory types in accordance with entries provided to a PAT in the memory. In a particular embodiment, this block includes disabling one or more variable MTRR register pairs that include overlapping memory regions with the memory regions specified by the PAT entries. In another embodiment, the one or more variable MTRR register pairs remain enabled, but the ultimate memory types of the memory regions specified by the PAT entries are determined in accordance with the priority rules of the processor. An example of enabling the PAT mechanism and specifying memory regions in accordance with entries in a PAT table may include loading PAT control bits 227 with a base physical address for PAT 232, and then adding an entry to the PAT specifying the memory region associated with the video frame buffer as write combining (WC) memory and adding another entry to the PAT specifying the memory region associated with the flash port as write protected (WP) memory, as shown in exemplary memory map 242.

A decision is made as to whether or not a legacy boot portion of the pre-OS stage is to be executed in decision block 308. If not, the "NO" branch of decision block 308 is taken and the method proceeds to decision block 316, as described below. If so, the "YES" branch of decision block 308 is taken and the PAT entries for the selected memory regions are disabled and the variable MTRR register pairs associated with the overlapping memory regions are enabled in block 310. The legacy boot portion of the pre-OS stage is executed in block 312. The PAT entries for the selected memory regions are re-enabled and the variable MTRR register pairs associated with the overlapping memory regions are disabled in block 314, and the method proceeds to decision block 316.

If the legacy boot portion of the pre-OS stage was not to be executed and the "NO" branch of decision block 308 was taken, or if the legacy boot portion was executed in block 312 and the PAT entries were re-enabled and the variable MTRR register pairs were disabled in block 314, then a decision is made as to whether or not an I/O access portion of the pre-OS stage needs to cache I/O transactions in decision block 316. If not, the "NO" branch of decision block 316 is taken and the method proceeds to block 320 as described below. If so, the "YES" branch of decision block 316 is taken, the PAT entries for the selected memory regions are utilized in processing the I/O transactions in block 318, and the method proceeds to block 320. If no I/O transactions need to be cached and the "NO" branch of decision block 316 was taken, or after the PAT entries were utilized in processing I/O transactions in block 318, the end of the pre-OS stage is reached and the variable MTRR register pairs are enabled, the PAT mechanism of the processor is disabled, and the PAT in memory is set to default values in block 320, the pre-OS stage ends and the boot loader is invoked to boot the OS in block 322, and the method ends in block 324.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
a memory including a cache; and
a processor to execute pre-operating system (pre-OS) code before the processor executes boot loader code, the pre-OS code to:
set up a Memory Type Range Register (MTRR) to define a first memory type for a memory region of the memory, wherein the first memory type specifies a first cacheability setting on the processor for data from the memory region;
set up a page attribute table (PAT) with an entry to define a second memory type for the memory region, wherein the second memory type specifies a second cacheability setting on the processor for data from the memory region;
disable the PAT; and
pass execution by the processor to the boot loader code.

2. The information handling system of claim 1, wherein, after setting up the PAT, but before disabling the PAT, the processor is further to execute the pre-OS code to:
determine that the pre-OS code includes legacy code to be executed in a 16-bit real mode by the processor.

3. The information handling system of claim 2, wherein disabling the PAT is in response to determining that the pre-OS code includes the legacy code.

4. The information handling system of claim 3, wherein, after disabling the PAT, the processor is further to execute the pre-OS code to:
run the legacy code, wherein in running the legacy code, the first memory region is accessed by the processor in accordance with the first memory type as specific by the MTRR; and
after running the legacy code, re-enable the PAT.

5. The information handling system of claim 4, wherein, after re-enabling the PAT, the processor is further to execute the pre-OS code to:
access a memory mapped input/output (MMIO) device at the first memory region in accordance with the second memory type as specified by the PAT entry.

6. The information handling system of claim 1, wherein the first cacheability setting specifies that data from the memory region is uncacheable and the second cacheability setting specifies that data from the memory region is cacheable.

7. The information handling system of claim 6, wherein, prior to disabling the PAT, the processor is further to execute the pre-OS code to:
access a memory mapped input/output (MMIO) device at the first memory region in accordance with the second memory type as specified by the PAT entry; and
store data retrieved from the memory region in the cache.

8. The information handling system of claim 7, wherein the MMIO device comprises a flash memory device and the second cacheability setting provides that the first memory region is write protected.

9. The information handling system of claim 7, wherein the MMIO device comprises a video frame buffer and the second cacheability setting provides that the first memory region is write combined.

10. A method, comprising:
setting up, by a pre-operating system (pre-OS) code executable by a processor of an information handling system before the processor executes boot loader code, a Memory Type Range Register (MTRR) of the processor to define a first memory type for a memory region of a memory of the information handling system before the processor executes boot loader code, wherein the processor includes a cache, and wherein the first memory type specifies a first cacheability setting on the processor for data from the memory region;

setting up, by the pre-OS code, a page attribute table (PAT) with an entry to define a second memory type for the memory region, wherein the second memory type specifies a second cacheability setting on the processor for data from the memory region;

disabling, by the pre-OS code, the PAT; and passing, by the pre-OS code, execution by the processor to the boot loader code.

11. The method of claim 10, wherein, after setting up the PAT, but before disabling the PAT, the method further comprises:

determining that the pre-OS code includes legacy code to be executed in a 16-bit real mode by the processor.

12. The method of claim 11, wherein disabling the PAT is in response to determining that the pre-OS code includes the legacy code.

13. The method of claim 12, wherein, after disabling the PAT, the method further comprises:

running the legacy code, wherein in running the legacy code, the first memory region is accessed by the processor in accordance with the first memory type as specific by the MTRR; and after running the legacy code, re-enabling the PAT.

14. The method of claim 13, wherein, after re-enabling the PAT, the method further comprises:

accessing a memory mapped input/output (MMIO) device at the first memory region in accordance with the second memory type as specified by the PAT entry.

15. The method of claim 10, wherein the first cacheability setting specifies that data from the memory region is uncacheable and the second cacheability setting specifies that data from the memory region is cacheable.

16. The method of claim 15, wherein, prior to disabling the PAT, the method further comprises:

accessing a memory mapped input/output (MMIO) device at the first memory region in accordance with the second memory type as specified by the PAT entry; and storing data retrieved from the memory region in the cache.

17. The method of claim 16, wherein the MMIO device comprises a flash memory device and the second cacheability setting provides that the first memory region is write protected.

18. The method of claim 16, wherein the MMIO device comprises a video frame buffer and the second cacheability setting provides that the first memory region is write combined.

19. A method, comprising:

setting up, by a pre-operating system (pre-OS) code executable by a processor of an information handling system before the processor executes boot loader code, a page attribute table (PAT) with an entry to define a memory type for a memory region of a memory of the information handling system before the processor executes boot loader code, wherein the memory type specifies a cacheability setting on the processor for data from the memory region;

determining that the pre-OS code includes legacy code to be executed in a 16-bit real mode by the processor;

disabling, by the pre-OS code, the PAT in response to determining that the pre-OS code includes legacy code;

running the legacy code, wherein in running the legacy code, the memory region is accessed by the processor in accordance with the second memory type as specific by an MTRR of the processor;

re-enabling, by the pre-OS code, the PAT after running the legacy code; and disabling, by the pre-OS code, the PAT prior to passing execution by the processor to the boot loader code.

20. The method of claim 19, wherein the cacheability setting specifies that data from the memory region is cacheable.

* * * * *